United States Patent Office.

FRANZ SCHUBERT, OF GANSTADT, NEAR BAMBERG, GERMANY, ASSIGNOR TO JOHANN GEORG HELD, OF BAMBERG, GERMANY.

MANUFACTURE OF SUBSTANCE FOR FILLING HOLLOW BRAKE-BEAMS.

SPECIFICATION forming part of Letters Patent No. 723,319, dated March 24, 1903.

Application filed November 15, 1902. Serial No. 131,566. (No specimens.)

*To all whom it may concern:*

Be it known that I, FRANZ SCHUBERT, a subject of the King of Bavaria, and a resident of Ganstadt, near Bamberg, Bavaria, Germany, have invented certain new and useful Improvements in the Manufacture of Substances to be Filled into Hollow Brake-Shoes; and I do hereby declare the following to be a full, clear, and exact description of my invention.

The present invention relates to an improved method for manufacturing a substance which is to be filled into hollow brake-shoes, thus replacing solid iron brake-shoes. The manufacture of such a substance according to my invention is executed in the following manner: Three parts of asphalt, two parts of plaster-of-paris, one part of milled leather of the best quality, three parts of quartz, and one part of shellac are comminuted, relatively pulverized, then completely mixed together, and finally cooked to a pulp. The substance prepared as above described is then filled into forms or directly to the hollow brake-shoe and dried. It was seen that the addition of plaster-of-paris chiefly prevents the substance from becoming soft in use, from which reason the addition of plaster-of-paris also may be increased.

Having now described my invention, what I claim is—

A method for manufacturing a substance for brake-shoes, characterized in this that three parts of asphalt and about two parts of plaster-of-paris, with one part of leather, three parts of quartz and one part of shellac are cooked to a pulp, which is to be filled into hollow brake-shoes.

In testimony whereof I affix my signature in presence of witnesses.

FRANZ SCHUBERT.

Witnesses:
HANS SCHUSTER,
G. BARDEL.